United States Patent [19]
Weingart et al.

[11] Patent Number: 5,985,985
[45] Date of Patent: Nov. 16, 1999

[54] POLYURETHANES

[75] Inventors: Franz Weingart, Leimen; Uwe Burkhardt, Frankenstein; Stephan Bauer, Hochdorf-Assenheim; Wolfgang Reich, Maxdorf; Albert Kohl, Laumersheim, all of Germany

[73] Assignee: BASF Aktiengesellschaft, Ludwigshafen, Germany

[21] Appl. No.: 08/882,732

[22] Filed: Jun. 26, 1997

[30] Foreign Application Priority Data

Jul. 3, 1996 [DE] Germany ............... 196 26567

[51] Int. Cl.$^6$ .................. C08J 3/00; C08K 3/20; C08L 75/00
[52] U.S. Cl. .................. 524/590; 524/591; 524/839; 524/840; 525/123; 525/455
[58] Field of Search .................. 525/123, 455; 524/590, 591, 839, 840

[56] References Cited

U.S. PATENT DOCUMENTS

Re. 31,022  8/1982  Buchwalter et al. ............... 523/418
4,131,731  12/1978  Lai et al. ............... 528/370

FOREIGN PATENT DOCUMENTS 416 386  3/1991  European Pat. Off. .
979 667  1/1965  United Kingdom .

OTHER PUBLICATIONS

*Ullmann's Enc. of Ind. Chem,* 5 Ed., vol. A18, 1991, pp. 362–368.
C.A. May, "Epoxy Resins Chem. and Tech.", Meral Dekker Inc., New York/Basel, 1988.
J. Mar., "Adv. Org. Chem.", 3 Ed., 1985, pp. 689–692.
"Organikum", 16. Aulf., VEB Deutscher Verlag der Wissenschaft, Berlin 1976, p. 504–505.

*Primary Examiner*—Patrick D. Niland
*Attorney, Agent, or Firm*—Keil & Weinkauf

[57] ABSTRACT

Polyurethanes I obtained by reacting 1) an isocyanate II as defined in the specification with
2) a compound V which is suitable as chain extender, obtained by
   a) reacting a polyhydric alcohol VI with
   b1) a compound VII, which includes an epoxy function and, in addition, an alcohol-reactive functional group, to form a compound VIII, and reacting a compound VIII with an $\alpha,\beta$-olefinically unsaturated carboxylic acid IX to give a compound X or
   b2) an $\alpha,\beta$-olefinically unsaturated carboxylic acid IX, to give a compound X and
   c) reacting a compound X with an amine XI having at least one primary amino which is reactive toward the $\alpha,\beta$ multiple bond of IX, the sum of the number of isocyanato-reactive aminos and hydroxyls of the compound V being greater than the number of isocyanate groups of the compound II. The polyurethanes are useful as binders or binder components for pigment0free or pigment-containing coatings.

15 Claims, No Drawings

POLYURETHANES

The present invention relates to polyurethanes, to a process for preparing the polyurethanes, to their use as binders or binder component for coatings, and to novel binder systems, and coated articles comprising such binder systems.

Aqueous and organic solutions of polymers, possibly containing a pigment, are widely employed to prepare colorless or colored coating materials and coatings (Ullmann's Encyclopedia of Industrial Chemistry, 5th ed., Vol. A18, pp. 362–368, VCH Publishers Inc., Weinheim-New York, 1991).

To prepare the coating materials, these solutions or suspensions are applied to a substrate or a base material. Following the removal of the solvent, the polymer dries physically and/or cures chemically by means of crosslinking.

Polyurethanes are known to be useful polymers for such coating materials, and can be crosslinked with polyisocyanates to give a tack-free film having the desired hardness and insolubility of the coating in solvents.

Polymers of this kind have the disadvantage, however, that they cure relatively slowly. A consequence of this is that the coating film, immediately after coating and the removal of the solvent, is still not tack-free and fully cured. Furthermore, the ultimate hardness of the binder and the abrasion resistance are often inadequate.

It is an object of the present invention to find polymers which are useful as coating materials and which provide a technically simple solution to the abovementioned problems.

We have found that this object is achieved by polyurethanes I, obtainable by reacting 1) an isocyanate II selected from the group consisting of
    a) prepolymers obtainable by reacting
        a1) a polyhydric alcohol III having more than one isocyanate-reactive hydroxyl per molecule of III, with
        a2) an aromatic or aliphatic, polyfunctional isocyanate IV, the ratio of the number of isocyanate-reactive hydroxyls of III to the number of isocyanate groups in IV being less than 1, and
    b) aromatic or aliphatic, polyfunctional isocyanates IV with
2) a compound V which is suitable as chain extender, obtainable by
    a) reacting a polyhydric alcohol VI with
        b1) a compound VII, which includes an epoxy function and, in addition, an alcohol-reactive functional group, to form a compound VIII, and reacting a compound VIII with an $\alpha,\beta$-olefinically unsaturated carboxylic acid IX to give a compound X or
        b2) an $\alpha,\beta$-olefinically unsaturated carboxylic acid IX, to give a compound X and
    c) reacting a compound X with an amine XI having at least one primary amino which is reactive toward the an multiple bond of IX, the sum of the number of isocyanato-reactive aminos and hydroxyls of the compound V being greater than the number of isocyanate groups of the compound II,
by a process fur their preparation, by their use as coating materials and binders for coatings, pigment preparations and pigment-containing coatings, and by novel binders, by pigment preparations containing such binders, and by coated articles comprising such a binder system.

Suitable compounds III are primarily polyhydric alcohols having preferably 2 to 4, in particular 2 to 3, hydroxyls per molecule and mean average molecular weights (number averages) of from 62 to 5000. Of particular advantage in this context are polymers containing functional groups, such as polyesterols, polyetherols, polycarbonatediols or polycaprolactonediols, the monomeric alcohols on which such polymers are based, and also mixtures of such compounds.

The polyesterols are, expediently, predominantly linear polymers with terminal OH groups, preferably those with two or three, especially two OH end groups. The acid number of the polyesterols is less than 10 and preferably less than 3. The polyesterols can be prepared in a simple manner by esterifying aliphatic or aromatic dicarboxylic acids of 4 to 15 carbons, preferably 4 to 10 carbons, with glycols, preferably glycols of 2 to 25 carbons, or by polymerizing lactones of 3 to 20 carbons. As dicarboxylic acids it is possible, for example, to employ glutaric, pimelic, suberic, sebacic, dodecanoic and, preferably, adipic and succinic acids. Suitable aromatic dicarboxylic acids are terephthalic, isophthalic or phthalic acids or mixtures thereof with other dicarboxylic acids, for example diphenic, sebacic, succinic and adipic acid. The dicarboxylic acids can be used individually or as mixtures. To prepare the polyesterols it may be advantageous to use, instead of the dicarboxylic acids, the corresponding acid derivatives, such as carboxylic anhydrides or carbonyl chlorides. Examples of suitable glycols are diethylene glycol, 1,5-pentanediol, 1,10-decanediol and 2,2,4-trimethyl-1,5-pentanediol. Preference is given to the use of 1,2-ethanediol, 1,3-propanediol, 2-methyl-1,3-propanediol, 1,4-butanediol, 1,6-hexanediol, 2,2-dimethyl-1,3-propanediol, 1,4-dimethylolcyclohexane, 1,4-diethanolcyclohexane, ethoxylated or propoxylated products of 2,2-bis(4-hydroxyphenyl)propane (bisphenol A). Depending on the desired properties of the polyurethanes I, the polyols can be used alone or as a mixture in various proportions. Examples of suitable lactones for preparing the polyesterols are $\alpha,\alpha$-dimethyl-$\beta$-propiolactone, $\gamma$-butyrolactone and, preferably, $\epsilon$-caprolactone.

The polyetherols are essentially linear substances which carry terminal hydroxyls and include ether linkages. Suitable polyetherols can be prepared readily by polymerizing cyclic ethers, such as tetrahydrofuran, or by reacting one or more $C_2$—$C_4$-alkylene oxides with a starter molecule which has two active hydrogens in the alkylene moiety. Examples of alkylene oxides are ethylene oxide, 1,2-propylene oxide, epichlorohydrin, 1,2-butylene oxide and 2,3-butylene oxide. The alkylene oxides can be used individually, alternately, in succession or as a mixture. Examples of suitable starter molecules are water, glycols such as ethylene glycol, propylene glycol, 1,4-butanediol and 1,6-hexanediol, amines such as ethylenediamine, hexamethylenediamine and 4,4-diaminodiphenylmethane, and amino alcohols such as ethanolamine. Suitable polyesterols and polyetherols and their preparation are described, for example, in EP-B 416 386, while suitable polycarbonatediols, preferably those based on 1,6-hexanediol, and their preparation are described, for example, in U.S. Pat. No. 4 131 731.

In amounts of up to 30% by weight, based on overall mass of the compound III, it is possible with advantage for aliphatic diols of 2 to 20 carbons, preferably 2 to 10 carbons, to be considered, such as 1,2-ethanediol, 1,3-propanediol, 1,4-butanediol, 1,6-hexanediol, 1,5-pentanediol, 1,10-decanediol, 2-methyl-1,3-propanediol, 2,2-dimethyl-1,3-propanediol, 2-methyl-2-butyl-1,3-propanediol, 2,2-dimethyl-1,4-butanediol, 1,4-dimethylolcyclohexane, neopentylglycol hydroxypivalate, diethylene glycol, triethylene glycol and methyldiethanolamine or aromatic-aliphatic or aromatic-cycloaliphatic diols of 8 to 30 carbons, suitable aromatic structures being heterocyclic ring systems or, preferably, isocyclic ring systems, such as naphthalene derivatives or, in particular, benzene derivatives, such as bisphenol A, symmetrically diethoxylated bisphenol A, symmetrically dipropoxylated bisphenol A, more highly ethoxylated or propoxylated bisphenol A derivatives or bisphenol F derivatives, and mixtures of such compounds. Mixtures of the diols can also be used.

In amounts of up to 5% by weight, based on the overall mass of the compound III, it is possible with advantage for aliphatic triols of 3 to 15 carbons, preferably 3 to 10 carbons, to be considered, such as trimethylolpropane or glycerol, the reaction products of such compounds with ethylene oxide and/or propylene oxide, and also mixtures of such compounds.

The compounds II may carry functional groups, for example neutral groups such as siloxane groups, basic groups such as, in 40 particular, tertiary amino, or acidic groups or salts thereof, or groups which readily undergo transition to acidic groups, these groups being introduced by way of a polyhydric alcohol III. Preferably it is possible to use diol components which carry such groups, such as N-methyldiethanolamine, N,N-bis(hydroxyethyl)-aminomethylphosphonic acid diethyl ester or N,N-bis(hydroxy-ethyl)-2-aminoacetic acid 3-sulfopropyl ester, or dicarboxylic acids which carry such groups and can be used to prepare polyesterols, such as 5-sulfoisophthalic acid.

Acidic groups are, in particular, the phosphoric acid, phosphonic acid, sulfuric acid and sulfonic acid groups, carboxyl, or the ammonium group.

Examples of groups which readily undergo transition to acidic groups are the ester group or salts, preferably of the alkali metals, such as lithium, sodium or potassium.

Preferably suitable as compound IV are diisocyanates of 6 to 30 carbons. With an advantage it is possible to employ aliphatic noncyclic diisocyanates, such as 1,5-hexamethylene diisocyanate and 1,6-hexamethylene diisocyanate, aliphatic cyclic diisocyanates, such as 1,4-cyclohexylene diisocyanate, dicyclohexylmethane diisocyanate and isophorone diisocyanate of the formula

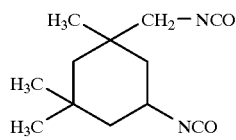

or aromatic diisocyanates, such as tolylene 2,4-diisocyanate, tolylene 2,6-diisocyanate, m-tetramethylxylene diisocyanate, p-tetramethylxylene diisocyanate, 1,5-tetrahydronaphthylene diisocyanate and 4,4'-diphenylenemethane diisocyanate, or mixtures of such compounds.

Components III and IV are, in accordance with the invention, to be used in amounts such that the ratio of the number of isocyanate-reactive hydroxyls of III to the number of isocyanate groups of IV is less than 1. In this context, the number of free hydroxyls of III can be determined in accordance with DIN 53240.

The reaction to form the novel prepolymers can be undertaken in a manner known per se, and it is advisable here to use a catalyst, preferably a tertiary amine, such as triethylamine, tributylamine, diazabicyclo[2.2.2]octane, N-methylpyridine or N-methylmorpholine. Further suitable catalysts are organometallic compounds, such as dibutyltin dilaurate, and metal salts, such as tin octoate, lead octoate or zinc stearate. The amount of catalysts is generally from 1 to 500 ppm by weight based on the overall weight of all precursors III and IV.

The use of a solvent or diluent at the same time is not necessary but is preferred.

Suitable solvents or diluents are hydrocarbons, especially toluene, xylene or cyclohexane, esters, especially ethylglycol acetate, ethyl acetate or butyl acetate, amides, especialy dimethylformamide or N-methylpyrrolidone, sulfoxides, especially dimethyl sulfoxide, ketones, especially methyl ethyl ketone or cyclohexanone, ethers, especially diisopropyl ether or methyl tert-butyl ether or, preferably, cyclic ethers, especially tetrahydrofuran or dioxane. The solvents or diluents can be employed individually or as mixtures.

The reaction is generally carried out at from 20 to 100° C., preferably from 50 to 70° C., leading to reaction times of from 2 to 6 hours.

The prepolymer can be isolated from the reaction mixture by known methods, for example by extraction, precipitation or spray drying, or can with advantage be used to prepare the novel polyurethanes I.

Suitable compounds VI are polyhydric alcohols, especially dihydric alcohols. With advantage it is possible to employ aliphatic diols of 2 to 20 carbons, preferably 2 to 10 carbons, such as 1,2-ethanediol, 1,3-propanediol, 1,4-butanediol, 1,6-hexanediol, 1,5-pentanediol, 1,10-decanediol, 2-methyl-1,3-propanediol, 2,2-dimethyl-1,3-propanediol, 2-methyl-2-butyl-1,3-propanediol, 2,2-dimethyl-1,4-butanediol, 1,4-cyclohexanedimethanol, neopentylglycol hydroxypivalate, diethylene glycol, triethylene glycol, tetraethylene glycol, dipropylene glycol and methyldiethanolamine or aromatic-aliphatic or aromatic-cycloaliphatic diols of 8 to 30 carbons, suitable aromatic structures being heterocyclic ring systems or, preferably, isocyclic ring systems, such as naphthalene derivatives or, in particular, benzene derivatives, such as hydroquinone, 4,4'-dihydroxybiphenyl, bisphenol A, symmetrically diethoxylated bisphenol A, symmetrically dipropoxylated bisphenol A, more highly ethoxylated or propoxylated bisphenol A derivatives or bisphenol F derivatives, and mixtures of such compounds. Mixtures of the diols can also be used.

As substances VII which react with the hydroxyls of VI it is possible to employ many classes of substance, examples being epoxidized olefins, glycidyl esters of saturated or unsaturated carboxylic acids, glycidyl ethers of aliphatic or aromatic polyols, or epoxyalkyl halides. Suitable examples are (+)-1-chloro-2,3-epoxy-2-methylpropane, (−)-1-chloro-2,3-epoxy-2-methylpropane and ()-1-chloro-2,3-epoxy-2-methylpropane, and, in particular, (+)-1-chloro-2,3-epoxypropane, (−)-1-chloro-2,3-epoxypropane and ()-1-chloro-2,3-epoxypropane, and also mixtures of such compounds.

The reaction to give the novel compound VIII can be undertaken in a manner known per se and as described, for example, in C. A. May, Epoxy Resins Chemistry and Technology, Marcel Dekker Inc., New York/Basel, 1988.

Compounds of this kind are known per se. Particular preference is given to polyglycidyl compounds of the bisphenol A type and glycidyl ethers of polyhydric alcohols, for example of butanediol, of hexanediol, of neopentylglycol, of 1,4-cyclohexanedimethanol, of glycerol and of pentaerythritol, examples being Epikote 812, Epikote 828 and Epikote 162 from Shell or Heloxy 68 and Heloxy 107 from Rhône-Poulenc.

The compound VIII can be isolated from the reaction mixture by known methods, for example by extraction, precipitation or spray drying, or can be employed advantageously for preparing the compound X.

Suitable compounds IX are primarily carboxylic acids of the formula

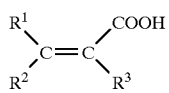

where $R^1$, $R^2$ and $R^3$ are hydrogen or $C_1$—$C_4$-alkyl, preference being given to acrylic and methacrylic acids. It is also possible to employ mixtures of various such carboxylic acids.

The reaction of VI, VIII or mixtures of VI and VIII to give the novel compound X can be undertaken in a manner known per se, preferably at from 90 to 130° C., particularly preferably at from 100 to 110° C., and advantageously for a time until the reaction mixture has an acid number of below 5 mg of KOH/g.

As catalyst for the reaction of a compound VIII with a compound IX it is possible, for example, to employ KOH, quaternary ammonium or phosphonium compounds, tertiary amines, phosphines such as triphenylphosphine, or Lewis bases, such as thiodiglycol.

The catalysts are preferably used in amounts of from 0.01 to 5% by weight, particularly preferably from 0.1 to 3% by weight, based on the compound VIII.

The use of a solvent or diluent at the same time is not necessary but is preferred. Suitable solvents or diluents are hydrocarbons, especially toluene, xylene or cyclohexane, esters, especially ethyl glycolacetate, ethyl acetate or butyl acetate, amides, especially dimethylformamide or N-methylpyrrolidone, sulfoxides, especially dimethyl sulfoxide, ketones, especially methyl ethyl ketone or cyclohexanone, ethers, especially diisopropyl ether or methyl tert-butyl ether or, preferably, cyclic ethers, especially tetrahydrofuran or dioxane. The solvents or diluents can be employed individually or as mixtures.

To avoid premature polymerization the reaction is carried out in particular using acrylic or methacrylic acid, expediently in the presence of small amounts of inhibitors. Suitable inhibitors are the customary compounds used to prevent thermal polymerization, for example compounds of the hydroquinone, hydroquinone monoalkyl ether, 2,6-di-tert-butylphenol, N-nitrosamine, phenothiazine or phosphorous ester type. They are generally employed in amounts of from 0.005 to 0.5% by weight, based on the compound IX.

For the reaction, compound VIII is generally introduced as initial charge for the reaction and compound IX is added.

The compound X can be isolated from the reaction mixture by known methods, for example by extraction, precipitation or spray drying, or can advantaeously be employed to prepare the compound V.

Suitable compounds XI having at least one primary amino function are amines of 2 to 20 carbons, preferably 2 to 12 carbons, such as ethylamine, n-propylamine, i-propylamine, n-butylamine, sec-butylamine, tert-butylamine, 1-aminoisobutane, substituted amines of 2 to 20 carbons, such as polyfunctional amines, especially 2-(N,N-dimethylamino)-1-aminoethane, amino mercaptans, especially 1-amino-2-mercaptoethane, advantageously aliphatic amino alcohols of 2 to 20 carbons, preferably 2 to 12 carbons, such as ethanolamine, 1-amino-3,3-dimethylpentan-5-ol, 2-aminoethyl-2',2"-diethanolamine, 1-amino-2,5-dimethylcyclohexan-4-ol, 2-aminopropanol, 2-aminobutanol, 3-aminopropanol, 1-amino-2-propanol, 2-amino-2-methyl-1-propanol, 5-aminopentanol, 3-aminomethyl-3,5,5-trimethylcyclohexanol, 1-amino-1-cyclopentanemethanol or 2-amino-2-ethyl-1,3-propanediol, or aromatic-aliphatic or aromatic-cycloaliphatic amino alcohols of 6 to 20 carbons, suitable aromatic structures being heterocyclic ring systems or, preferably, isocyclic ring systems, such as naphthalene derivatives or, in particular, benzene derivatives, such as 2-aminobenzyl alcohol, 3-(hydroxymethyl)aniline, 2-amino-3-phenyl-1-propanol, 2-amino-l-phenylethanol, 2-phenylglycinol or 2-amino-1-phenyl-1,3-propanediol and mixtures of such compounds. Mixtures of the amines can also be used.

The reaction to give the novel compound V can be undertaken in a manner known per se and as described, for example, in J. March, Adv. Org. Chem., 3rd ed., Wiley Interscience, New York, 1985, page 689ff. or Organikum, 16th edition, VEB Deutscher Verlag der Wissenschaft, Berlin, 1976, page 504f.

The use of a solvent or diluent at the same time is not necessary but is preferred. Suitable solvents or diluents are hydrocarbons, especially toluene, xylene or cyclohexane, esters, especially ethyl glycolacetate, ethyl acetate or butyl acetate, amides, especially dimethylformamide or N-methylpyrrolidone, sulfoxides, especially dimethyl sulfoxide, ethers, especially diisopropyl ether or methyl tert-butyl ether or, preferably, cyclic ethers, especially tetrahydrofuran or dioxane. The solvents or diluents can be employed individually or as mixtures.

For the reaction, the compound XI is introduced as initial charge and component X is added.

The reaction is generally carried out at from 0 to 100° C., preferably from 20 to 80° C., leading to reaction times of from 0.5 to 8 hours.

The compound V can be isolated from the reaction mixture by known methods, for example by extraction, precipitation or spray drying, or can with advantage be employed to prepare the compound I.

To prepare the novel polyurethanes I, the reaction product V is reacted with a compound II or with mixtures of such compounds. The number of free reactive groups of V can be determined, in the case of amino, in accordance with DIN 53176 and, in the case of hydroxyl, in accordance with DIN 53240; the number of isocyanate groups of II can be determined in accordance with DIN EN 1242.

In accordance with the invention, components II and V are to be used in amounts such that the ratio of the number of isocyanate-reactive groups, especialy aminos and hydroxyls, of V to the number of isocyanate groups of II is greater than 1.

The reaction of a compound II with a compound V to form the novel polyurethane I can be undertaken in a manner known per se, and it is advisable here to use a catalyst, preferably a tertiary amine, such as triethylamine, tributylamine, diazabicyclo[2.2.2]octane, N-methylpyridine or N-methylmorpholine. Further suitable catalysts are organometallic compounds, such as dibutyltin dilaurate, and metal salts, such as tin octoate, lead octoate or zinc stearate. The amount of catalysts is generally from 1 to 500 ppm by weight based on the overall weight of all precursors II and V.

The use of a solvent or diluent at the same time is not necessary but is preferred. Suitable solvents or diluents are hydrocarbons, especially toluene, xylene or cyclohexane, esters, especially ethyl glycolacetate, ethyl acetate or butyl acetate, amides, especially dimethylformamide or N-methylpyrrolidone, sulfoxides, especially dimethyl sulfoxide, ethers, especially diisopropyl ether or methyl tert-butyl ether or, preferably, cyclic ethers, especially tetrahydrofuran or dioxane. The solvents or diluents can be employed individually or as mixtures.

The reaction is generally carried out at from 20 to 100° C., preferably from 20 to 60° C., leading to reaction times of from 0.5 to 5 hours.

The polyurethane I can be isolated from the reaction mixture by known methods, for example by extraction, precipitation or spray drying, or can be employed with advantage to prepare the pigment preparations or coatings mentioned at the outset.

The polymeric compositions I can be employed alone or together with a compound which promotes the crosslinking of the polymeric compositions I, as coating materials or binders.

If the polyurethanes I are employed as binders or binder component, they should advantageously have a molecular weight (weight average) of from 5000 to 200,000, preferably from 15,000 to 100,000.

Suitable crosslinking components are preferably polyfunctional isocyanates, especially those having more than two NCO groups per molecule, which have a molecular weight (number average) of from 500 to 5000, preferably from 500 to 2000. Such polyfunctional isocyanates can be obtained in a manner known per se by reacting hexamethylene diisocyanate, isophorone diisocyanate or, preferably, tolylene diisocyanate with a triol or diol, especially trimethylolpropane or diethylene glycol, or by forming biurets or isocyanurates.

In this context, the amount of the polyfunctional isocyanate should advantageously be such that the ratio of the number of isocyanate groups to the number of nonphenolic NCO-reactive groups of the polyurethane I is from 0.1:1 to 2.0:1, preferably from 0.5:1 to 1.5:1.

In this context, the number of isocyanate groups in the polyfunctional isocyanate can be determined in accordance with DIN EN 1242.

The polyfunctional isocyanates can be employed alone or in a mixture with other crosslinkers.

The polymeric compositions I and the mixtures of the polymeric compositions I with a crosslinker can be employed, alone or in a mixture with at least one further coating material or binder, as a pigment-free or pigment-containing coating material.

For pigment-containing coating materials it is possible to prepare pigment preparations from the pigments and the polyurethane I. This is done by expediently mixing the pigments, especially color pigments, with the polyurethanes I with or without additives, without solvent or, preferably, in the presence of at least one of the abovementioned diluents, in a manner known per se.

The pigment preparation can be isolated from the mixture by removing the diluent or, preferably, can be used for further processing without isolating it.

Suitable further coating materials or binders are polyurethanes, preferably polyurethanes having functional groups such as carboxyl, sulfonate or phosphonate groups, polyacrylates, polymethacrylates, polyacrylamide, polymers and copolymers of vinyl monomers, such as polystyrene, polyvinyl chloride, polyvinyl acetate, polyvinyl propionate and polyacrylonitrile, cellulose-containing binders, such as cellulose esters, especially cellulose nitrates, cellulose acetates, cellulose acetopropionate and cellulose acetobutyrate, phenoxy resins and epoxy resins, which can be obtained in a manenr known per se.

Additives which may be employed include dispersion auxiliaries, such as higher fatty acids, for example stearic acid, or salts thereof, fillers, such as inorganic and organic pigments, for example aluminum oxide, silicon dioxide, titanium dioxide, carbon black, polyethylene, polypropylene, chalking inhibitors, for example antimony oxide, or thixotropic substances, for example amorphous silicic acid.

The mixtures of pigment preparation and, if used, at least one further binder, additives or diluents are used in the customary manner as coating materials. For this purpose a polyurethane I, with or without a pigment or one of the abovementioned additives or crosslinkers, can be dissolved or dispersed in a solvent or diluent and applied in a manner known per se to a substrate or a base material. Subsequently, further processing can proceed as usual, for example by removing the diluent and, if necessary, curing the polymer.

The coating materials may include the novel polymers I or pigment preparations with the polymers I, alone or in a mixture with other pigments, pigment preparations or polymers.

Suitable solvents or diluents are generally water, ethers, such as tetrahydrofuran or dioxane, ketones, such as methyl ethyl ketone or cyclohexanone, esters, such as ethyl acetate, or hydrocarbons, such as alkanes, or else aromatic substances, or mixtures of such compounds.

EXAMPLES

1) Preparation of compound X

To 1 mol of a compound VI or VIII as in Table 1 and suitable stabilizers, 5 g of dimethylbenzylamine and then, over the course of 40 minutes, 2 mol of a compound IX were added. The mixture was then stirred at 110° C. for 8 h.

The products are summarized in Table 1.

2) Preparation of compound V

To a solution of 2 mol of a compound XI as in Table 2 in the same amount by weight of tetrahydrofuran (THF), a solution of 1 mol of a compound X as in Table 2 in the same amount by weight of THF was added with stirring over the course of 3 hours at 25° C.

The products are summarized in Table 2.

3) Preparation of compound III

The composition of the polymeric diols III are summarized in Table 3.

4) Preparation of compounds II

To a solution of 1 mol of precursor III as in Table 4 in the same amount by weight of THF, precursor IV as in Table 4 was added over the course of 5 minutes at 40° C. Following the addition of 5 drops of dibutyltin dilaurate (Desmorapid® Z, from Bayer AG), the mixture was held at 60° C. until the NCO content had fallen to the value corresponding to the NCO excess.

The products are summarized in Table 4.

5) Preparation of compound I

To the solution obtained as in Table 4, of compound II, 267 mmol of compound V as in Table 2 were added over the course of 5 minutes at 40° C., and the mixture was held at 60° C. until the NCO content had reached a value of less than 0.05%, based on NCO employed.

The products are summarized in Table 5.

Comparison example Ip

To the solution, obtained as in Table 4, of compound IIa, 267 mmol of ethoxylated bisphenol A (Dianol 22 from Shell) as in Table 6 were added over the course of 5 minutes at 40° C. and the mixture was held at 60° C. until the NCO content had reached a value of less than 0.05%, based on NCO employed.

The product data are summarized in Table 6.

TABLE 1

Preparation of compounds x

| Precursor VI or VIII | Precursor IX | Viscosity [Pa-s] | Product |
|---|---|---|---|
| 1,4-butanediol | acrylic acid | | Xa* |
| bisphenol A diglycidyl ether (Epikote ® 828, Shell) | acrylic acid | 7.4 | Xb |
| cyclohexanedimethanol diglycidyl ether (Heloxy ® 107, Rhone-Poulenc) | acrylic acid | 7.4 | Xc |
| neopentylglycol diglycidyl ether (Grilonit ® V51-47, Ems) | acrylic acid | 2.2 | Xd |

*1,4-butanediol diacrylate (Laromer ® BDDA [BASF])

TABLE 2

Preparation of compounds v

| Precursor X | Precursor XI | Product |
|---|---|---|
| Xa | ethanolamine | Va |
| Xb | ethanolamine | Vb |
| Xc | ethanolamine | Vc |
| Xd | ethanolamine | Vd |
| Xb | 1-amino-2-propanol | Ve |
| Xb | 2-amino-1-butanol | Vf |
| Xb | 2-amino-2-methyl-1-propanol | Vg |
| Xb | 2,2-dimethyl-5-amino-1-pentanol | Vh |
| Xb | 3-aminomethyl-3,5,5-trimethyl-1-hexanol | Vi |
| Xb | ω-aminopropyldi(ω-hydroxyethyl)amine | Vj |

TABLE 3

Compounds III

| Compound III | M or $M_w$ [g/mol] | OH No. [mg of KOH/g] | Product |
|---|---|---|---|
| polyesterol of adipic acid/isophthalic acid/1,4-dimethylolcyclohexane | 800 | 140 | IIIa |

TABLE 3-continued

Compounds III

| Compound III | M or $M_w$ [g/mol] | OH No. [mg of KOH/g] | Product |
|---|---|---|---|
| olyesterol of adipic acid/isophthalic acid/1,6-hexanediol | 1000 | 120 | IIIb |
| Elastophen ® 1010 (Elastogran) | 1000 | 120 | IIIc |
| Tegomer ® DS 3117 (Goldschmidt) | 1370 | 82 | IIId |
| hexanediol | 118 | 949 | IIIe |

TABLE 4

Preparation of compounds II

| Precursor III | Precursor IV | Molar ratio IV/III | Product II | Solids content [%] |
|---|---|---|---|---|
| IIIa | 4,4'-diphenylenemethane diisocyanate | 1.2 | IIa | 50 |
| IIIb: IIIc 1: 1 Gew./Gew. | 4,4'-diphenylenemethane diisocyanate | 1.2 | IIb | 50 |
| IIIa: IIId: IIIe 10/: 1: 2 Gew./Gew. | 4,4'-diphenylenemethane diisocyanate | 1.2 | IIc | 50 |
| IIIb | 4,4'-diphenylenemethane diisocyanate | 1.2 | IId | 50 |
| IIIa | isophorone diisocyanate | 1.2 | IIe | 50 |
| IIIa | 4,4'-diphenylenemethane diisocyanate | 1.11 | IIf | 50 |
| IIIa | 4,4'-diphenylenemethane diisocyanate | 1.05 | IIg | 50 |

TABLE 5

Preparation of compounds I

| Precursor II | Precursor V | Molar ratio V/II | $M_w$ (GPC) [g/mol] | Tg [° C.] | OH number [mg of KOH/g] | NH number [mg of KOH/g] | Product I | Solids content [%] |
|---|---|---|---|---|---|---|---|---|
| IIf | Va | 1.5 | — | — | 32 | 5.4 | Ia | 20 |
| IIa | Va | 1.5 | — | — | 17 | 2.8 | Ib | 20 |
| IIf | Vb | 1.5 | — | 61 | 57 | 5.7 | Ic | 20 |
| IIa | Vh | 1.33 | 30,800 | 70 | 45 | 5.6 | Id | 20 |
| IIa | Vj | 1.33 | — | — | 44 | 5.5 | Ie | 20 |
| IIf | Vi | 1.33 | 56,500 | 81 | 45 | 5.7 | If | 20 |
| IIa | Vc | 1.33 | 23,500 | 60 | 48 | 5.9 | Ig | 20 |
| IIa | Vd | 1.33 | 28,000 | 58 | 47 | 5.9 | Ih | 20 |
| IIa | Ve | 1.33 | 28,000 | 74 | 46 | 5.9 | Ii | 20 |
| IIb | Ve | 1.33 | 22,300 | −4 | 40 | 5.0 | Ij | 20 |
| IIc | Ve | 1.33 | 24,300 | 43 | 41 | 5.2 | Ik | 20 |
| IId | Ve | 1.33 | 30,800 | 9 | 40 | 4.9 | Im | 20 |
| IIe | Ve | 1.33 | 27,300 | 63 | 47 | 5.8 | In | 20 |
| IIa | Ve | 1.14 | 46,200 | 75 | 23 | 2.9 | Io | 20 |

TABLE 6

Preparation of comparison polyurethane Ip

| Precursor II | Precursor V | Molar ratio V/II | $M_w$ (GPC) [g/mol] | $T_g$ [°C.] | OH number [mg of KOH/g] | NH number [mg of KOH/g] | Product I | Solids content [%] |
|---|---|---|---|---|---|---|---|---|
| IIa | Vk | 1.5 | 19,000 | 68 | 32 | 0 | Ip | 20 |

Determination of mechanical properties of polymer I

Preparation of clearcoat films:

1) Uncrosslinked films:

20% strength solutions of product I in THF were applied using a manual doctor blade with a gap width of 200 μm to a polyethylene terephthalate film [50 μm]. The films were dried at 60° C. for 24 h.

2) Crosslinked films:

20% strength solutions of product I in THF were mixed with the adduct of trimethylolpropane and tolylene diisocyanate (Desmodur L®, from Bayer) and were applied with a manual doctor blade, gap width 200 μm, to a polyethylene terephthalate film [50 μm]. The films were dried at 60° C. for 24 h.

The film properties are summarized in Table 7.

TABLE 7

Preparation of clearcoat films

| Crosslinking | uncrosslinked | | crosslinked | | |
|---|---|---|---|---|---|
| Product | Ic | Ip | Ii | Ip | DIN |
| Ratio of NCO to NH and OH groups | 0 | 0 | 1.25 | 1.25 | |
| Modulus of elasticity [N/mm²] | 1350 | 1300 | 1950 | 1425 | DIN 53 457 |
| Tear strength [N/mm²] | 52 | 40 | 65 | 51 | DIN 53 504 |
| Extension [%] | 5 | 4 | 5 | 5 | DIN 53 457 |
| Pendulum hardness [s] | 218 | 210 | 220 | 211 | DIN 53 157 |

Measurement of the rate of crosslinking of polymer I with polyfunctional isocyanates

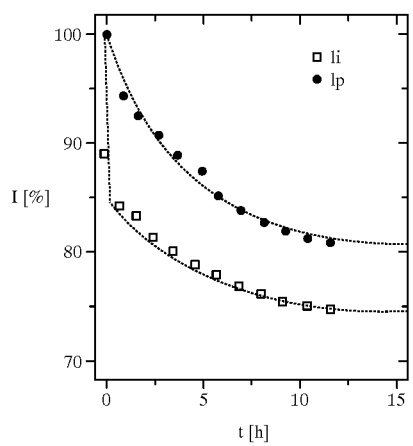

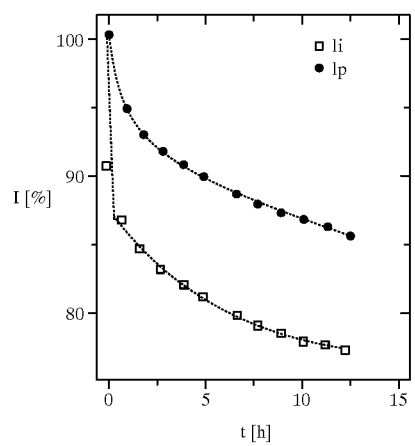

FIG. 1: IR-spectroscopic determination of the decrease in the NCO contents of I in clearcoat films at RT, $$I = 1 - \frac{\int_{2009\,cm^{-1}}^{2475\,cm^{-1}} D d\tilde{v}(t)}{\int_{2009\,cm^{-1}}^{2475\,cm^{-1}} D d\tilde{v}(t=0)}$$

I=Decrease in NCO content; D=transmissibility, v=wave number, t=time

We claim:

1. A polyurethane I suitable as a coating material or component thereof, obtained by reacting
   1) an isocyanate II selected from the group consisting of
      a) prepolymers obtained by reacting
         a1) a polyhydric alcohol III having more than one isocyanate-reactive hydroxyl per molecule of III, with
         a2) an aromatic or aliphatic, polyfunctional isocyanate IV,
         the ratio of the number of isocyanate-reactive hydroxyls of III to the number of isocyanate groups in IV being less than 1, and
      b) aromatic or aliphatic, polyfunctional isocyanates IV with
   2) a compound V which is suitable as chain extender, obtained by
      a) reacting a polyhydric alcohol VI with
      b1) a compound VII, which includes an epoxy function and, in addition, an alcohol-reactive functional group, to form a compound VIII, and reacting a compound VIII with an α,β-olefinically unsaturated carboxylic acid IX to give a compound X or
      b2) an α,β-olefinically unsaturated carboxylic acid IX, to give a compound X and
      c) reacting a compound X with an amine XI having at least one primary amino which is reactive toward the α,β-olefinically unsaturated bond of IX, the sum of the number of isocyanato-reactive aminos and hydroxyls of the compound V being greater than the number of isocyanate groups of the compound II.

2. A polyurethane I as defined in claim 1, obtained from an alcohol having two or three isocyanate-reactive hydroxyls as compound III.

3. A polyurethane I as defined in claim 1, obtained-from a hydroxyl-containing polyester or polyether as compound III.

4. A polyurethane I as defined in claim 1, obtained from an alcohol having a mean average molecular weight (number average) of from 62 to 5000 as compound III.

5. A polyurethane I as defined in claim 1, obtained from an aromatic or aliphatic diisocyanate as compound IV.

6. A polyurethane I as defined in claim 1, obtained from a dihydric alcohol VI.

7. A polyurethane I as defined in claim 1, obtained from 1,4-butanediol, 1,6-hexanediol, bisphenol A, 2, 2-dimethyl-1, 3-propanediol or 1,4-bis(hydroxymethyl)cyclohexane as compound VI.

8. A polyurethane I as defined in claim 1, obtained-from (+)-1-chloro-2,3-epoxypropane, (−)-1-chloro-2,3-epoxypropane, (+) -1-chloro-2, 3-epoxy-2-methylpropane or (−)-l-chloro-2,3-epoxy-2-methylpropane as compound VII.

9. A polyurethane I as defined in claim 1, obtained from acrylic or methacrylic acid as compound IX.

10. A polyurethane I as defined in claim 1, obtained from ethanolamine, 2-aminopropan-1-ol, 1-aminopropan-2-ol, 2-aminobutan-1-ol, 2,2-dimethyl-5-aminopentanol, 2-(aminoethyl)diethanolamine or 3,5,5-trimethyl-3-aminomethylcyclohexanol as amine XI.

11. A polyurethane I as defined in claim 1 having acidic or basic groups or salts thereof.

12. A polyurethane I as claimed in claim 1 having a sulfonic, phosphonic or carboxylic acid group, tert-amino, sulfonate, phosphonate, carboxylate or ammonium group as acidic or basic group.

13. A process for preparing a polyurethane I as defined in claim 1, which comprises reacting 1) an isocyanate II selected from the group consisting of
  a) prepolymers obtained by reacting
    a1) a polyhydric alcohol III having more than one isocyanate-reactive hydroxyl per molecule of III, with
    a2) an aromatic or aliphatic, polyfunctional isocyanate IV,
  the ratio of the number of isocyanate-reactive hydroxyls of III to the number of isocyanate groups in IV being less than 1, and
  b) aromatic or aliphatic, polyfunctional isocyanates IV with 2) a compound V which is suitable as chain extender, obtained by
  a) reacting a polyhydric alcohol VI with
    b1) a compound VII, which includes an epoxy function and, in addition, an alcohol-reactive functional group, to form a compound VIII, and reacting a compound VIII with an $\alpha,\beta$-olefinically unsaturated carboxylic acid IX to give a compound X or
    b2) an $\alpha,\beta$-olefinically unsaturated carboxylic acid IX, to give a compound X and
  c) reacting a compound X with an amine XI having at least one primary amino which is reactive toward the $\alpha,\beta$ multiple bond of IX, the sum of the number of isocyanato-reactive aminos and hydroxyls of the compound V being greater than the number of isocyanate groups of the compound II.

14. A binder system which can be cured by crosslinking, comprising a polyurethane I as claimed in claim 1 and a polyfunctional isocyanate XII, the amount of XII being such that the ratio of the number of isocyanate groups in XII to the number of isocyanate-reactive groups in I is from 0.1 to 2.0.

15. A coated article obtained by applying a coat comprising a binder system as claimed in claim 14 and then crosslinking it.

\* \* \* \* \*